United States Patent
Cameron et al.

(10) Patent No.: US 11,316,954 B2
(45) Date of Patent: Apr. 26, 2022

(54) SYSTEM AND METHOD FOR OFFLOADING APPLICATION EXTENSION SCRIPT EXECUTION FROM APPLICATION HOSTING INFRASTRUCTURE

(71) Applicant: SHOPIFY INC., Ottawa (CA)

(72) Inventors: David Cameron, Kitchener (CA); Jonathan Mitchell Dickinson, Kitchener (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 16/820,920

(22) Filed: Mar. 17, 2020

(65) Prior Publication Data

US 2021/0250424 A1 Aug. 12, 2021

Related U.S. Application Data

(60) Provisional application No. 62/971,614, filed on Feb. 7, 2020.

(51) Int. Cl.
| | |
|---|---|
| *H04L 29/08* | (2006.01) |
| *H04L 67/00* | (2022.01) |
| *G06Q 30/06* | (2012.01) |
| *H04L 67/51* | (2022.01) |
| *H04L 67/01* | (2022.01) |

(52) U.S. Cl.
CPC ......... *H04L 67/34* (2013.01); *G06Q 30/0641* (2013.01); *H04L 67/16* (2013.01); *H04L 67/42* (2013.01)

(58) Field of Classification Search
CPC ......... H04L 67/34; H04L 67/16; H04L 67/42; G06Q 30/0641
See application file for complete search history.

(56) References Cited

U.S. PATENT DOCUMENTS

| | | | | |
|---|---|---|---|---|
| 8,291,490 | B1 * | 10/2012 | Ahmed | G06F 21/604 726/17 |
| 8,374,894 | B2 * | 2/2013 | Weinstock | G06Q 10/025 705/5 |
| 9,455,876 | B1 * | 9/2016 | Grebenschikov | H04L 41/0806 |
| 9,531,745 | B1 * | 12/2016 | Sharma | G06F 40/205 |
| 9,733,921 | B1 * | 8/2017 | Saenz | G06F 8/60 |

(Continued)

OTHER PUBLICATIONS

Extended European Search Report and Search Opinion issued on European Patent Application No. 20215759.0 dated May 19, 2021, 10 pages.

(Continued)

*Primary Examiner* — Blake J Rubin

(57) ABSTRACT

The provided systems and methods attempt to address possible issues with the use of third party applications with software as a service (SAAS) platforms, namely that lack of performance of third party app hosting infrastructure running the third party applications can affect multiple clients on the SAAS platform. In order to least mitigate this, third party app providers can create and upload their scripts to the SAAS platform for execution on the SAAS platform. The scripts must conform with extension points within SAAS functionality that are predefined. During execution, when the extension point is reached, the script is run on the SAAS platform instead of making an API call to the application on the third party app hosting infrastructure.

17 Claims, 19 Drawing Sheets

229

| E-Commerce Platform | Q Search | | App Developer |
|---|---|---|---|
| Home<br>Applications<br>Resources<br>Scripts<br>Memory<br>Server Settings<br>Compiler Settings<br>Merchants | Extension Points - Shipping | | |
| | Input | Syntax Click to learn more | |
| | Shipping Address | shipAddress | |
| | Billing Address | billAddress | |
| | State | stateUSA | |
| | Province ▸230 | provinceCA ▸232 | |
| | Postal Code | postalCA | |
| | Zip Code | zipUSA | |
| | | | |
| | Output | Format Click to learn more | |
| | Duty | moneyAmount | |
| | DutyCurrency | country | |
| | ShipTime ▸234 | date[2] ▸236 | |
| | shipOptions | String[ ] | |

(56) References Cited

U.S. PATENT DOCUMENTS

| | | | |
|---|---|---|---|
| 9,825,964 B2* | 11/2017 | Mellor | G06F 16/211 |
| 10,951,606 B1* | 3/2021 | Shahidzadeh | H04W 4/14 |
| 11,042,953 B1* | 6/2021 | Delgado | G06T 7/001 |
| 2011/0153624 A1* | 6/2011 | Aigner | G06F 16/252 |
| | | | 707/754 |
| 2012/0011067 A1* | 1/2012 | Katzin | G06Q 20/0855 |
| | | | 705/44 |
| 2012/0197811 A1* | 8/2012 | Kearney | G06Q 30/016 |
| | | | 705/304 |
| 2012/0254431 A1* | 10/2012 | Kylau | G06F 9/54 |
| | | | 709/226 |
| 2013/0159892 A1* | 6/2013 | Suraj | G06F 16/958 |
| | | | 715/762 |
| 2013/0254231 A1* | 9/2013 | Decker | G06F 16/252 |
| | | | 707/770 |
| 2013/0290141 A1* | 10/2013 | Bhaskar | G06Q 30/0603 |
| | | | 705/26.61 |
| 2014/0278722 A1* | 9/2014 | Duerr | G06Q 10/06316 |
| | | | 705/7.26 |
| 2015/0019944 A1* | 1/2015 | Kalgi | H04L 67/20 |
| | | | 715/205 |
| 2015/0082372 A1* | 3/2015 | Kottahachchi | G06F 21/604 |
| | | | 726/1 |
| 2015/0095923 A1* | 4/2015 | Sarid | G06F 8/30 |
| | | | 719/328 |
| 2015/0261523 A1* | 9/2015 | Liu | G06F 8/65 |
| | | | 717/169 |
| 2015/0312422 A1* | 10/2015 | Leemet | G06Q 20/384 |
| | | | 455/406 |
| 2016/0117650 A1* | 4/2016 | Weidenmiller | G06Q 20/26 |
| | | | 705/44 |
| 2017/0011449 A1* | 1/2017 | Mueller | G06Q 30/0635 |
| 2017/0070484 A1* | 3/2017 | Kruse | H04L 63/0442 |
| 2017/0078302 A1 | 3/2017 | Mellor et al. | |
| 2017/0168783 A1* | 6/2017 | Liu | G06F 8/34 |
| 2017/0177882 A1* | 6/2017 | Allgaier | G06F 8/10 |
| 2017/0318083 A1* | 11/2017 | Ignatyev | H04L 67/1023 |
| 2018/0047018 A1* | 2/2018 | De Ganon | G06Q 20/401 |
| 2018/0139108 A1* | 5/2018 | Fulton | H04L 41/0645 |
| 2018/0365754 A1* | 12/2018 | Wall | G06Q 30/0601 |
| 2019/0056926 A1* | 2/2019 | Lindholm | G06F 9/5077 |
| 2019/0114160 A1* | 4/2019 | Yehuda | G06F 8/70 |
| 2019/0287314 A1* | 9/2019 | Rojo | B42D 25/305 |
| 2020/0050467 A1* | 2/2020 | Dobson | H04L 67/42 |
| 2020/0126105 A1* | 4/2020 | Joglekar | G06Q 40/00 |
| 2020/0151630 A1* | 5/2020 | Shakhnovich | G06F 40/174 |
| 2020/0175026 A1* | 6/2020 | Carvalho | G06F 16/904 |
| 2020/0241846 A1* | 7/2020 | Kismartoni | G06F 9/44521 |
| 2020/0242590 A1* | 7/2020 | Sarjaz | G06Q 20/3672 |
| 2021/0058349 A1* | 2/2021 | Young | H04L 51/10 |
| 2021/0133257 A1* | 5/2021 | Feijoo | G06F 16/9574 |

OTHER PUBLICATIONS

Examination Report issued in respect of corresponding Indian Patent Application No. 202124001410, dated Jan. 5, 2022.

* cited by examiner

229

| E-Commerce Platform | | | App Developer |
|---|---|---|---|
| Q Search | | | |

Home
Applications
Resources
Scripts
Memory
Server Settings
Compiler Settings
Merchants

Extension Points - Shipping

| Input | | Syntax Click to learn more |
|---|---|---|
| Shipping Address | | shipAddress |
| Billing Address | | billAddress |
| State | | stateUSA |
| Province | ⎫ 230 | provinceCA ⎫ 232 |
| Postal Code | | postalCA |
| Zip Code | ⎭ | zipUSA ⎭ |

| Output | | Format Click to learn more |
|---|---|---|
| Duty | | moneyAmount |
| DutyCurrency | ⎫ 234 | country |
| ShipTime | | date[2] ⎫ 236 |
| shipOptions | ⎭ | String[] ⎭ |

| E-Commerce Platform | 🔍 Search | Merchant |

- Home
- Applications
- Resources
- Scripts
- Memory
- Server Settings
- Compiler Settings
- Merchants

Postage    372 ~ Installed

*Current Latency: 10ms* ~374

This app will help you with shipping calculations and tracking, generate a plurality of postal services and price estimates, and estimates duty fees based on latest information available.

Determine where the script should operate:

High Volume Threshold: [ 1000 ] sales per hour ~376

High Volume Performance Location: [ SAAS Platform ▾ ] ~378
                                  [ 3rd Party Platform ]

High Volume Performance Location: [ SAAS Platform ▾ ] ~380
                                  [ 3rd Party Platform ]

FIG. 3C

E-Commerce Platform | Search | JG John's Apparel / Jonny B. Good

- Home
- Orders
- Products
- Customers
- Reports
- Discounts
- Apps

SALES CHANNELS ⊕
- Online Store
- Mobile App

View all channels

⚙ Settings

Good afternoon, Jonny B..
Here's what's happening with your store today.

Today's total sales   Today's visits
$98.00                1

● Update your Platform Payments tax details
We require additional information to verify your identity.
[Update tax details]

● Advanced Cash on Delivery has been deactivated for your store
[See why]

All channels ˅   Today ˅

TOTAL SALES
$98.00                           Jun 1
                                     2 orders
$125
$75
$25
      12am   8pm   4pm   11pm

TOTAL SALES BY CHANNEL   View dashboard
                                     Jun 1
Online Store                         0 orders
$0.00

Mobile app                           0 orders
$0.00

Shopify POS (126 York St.)           0 orders
$0.00

FIG. 7

SYSTEM AND METHOD FOR OFFLOADING APPLICATION EXTENSION SCRIPT EXECUTION FROM APPLICATION HOSTING INFRASTRUCTURE

CROSS REFERENCE TO RELATED APPLICATION

This application claims the benefit of U.S. Provisional Patent Application No. 62/971,614 filed Feb. 7, 2020, which is hereby incorporated by reference.

FIELD

The present disclosure relates to systems and methods for offloading application extension script execution from a third party application hosting infrastructure.

BACKGROUND

In order to run custom functionality provided by a third party application or app, in current software as a service (SAAS) platforms, for example E-commerce platforms, the third party application uses application interface (API) calls through the use of the application directly or via application extensions. In either case, there can be high latency associated with the use of API calls, and the application runs its code outside of the SAAS platform. If the app's infrastructure cannot accommodate a large enough volume of requests during periods of heavy load (e.g. flash sales, product drops), merchants that rely on the application can experience low availability of their stores during any high volume events of other merchants using the app. As a result, the app's hosting infrastructure needs to be able to handle such large volumes during peak events, however, this may not be practical for a small scale developer.

It is common for a SAAS platform to expose a lot of functionality and resources through APIs to enable apps to work with the SAAS platform in a collaborative manner. However, it is less common to see the reverse, namely integrations of apps into the SAAS platform. This can result in a gap between apps and a service instance that may be visible to users. For example, apps may run in completely separate tabs or have visible constraints, such as being constrained to an iFrame. This can lead to a disjointed user experience as users are required to jump repeatedly between multiple apps and the SAAS platform functionality.

SUMMARY

The provided systems and methods attempt to address or at least mitigate one or more of the problems referenced in the background section, by allowing apps to surface in a more native way within the SAAS platform. Extension points allow apps to integrate in SAAS platform workflows through the use of scripts that run on the SAAS platform. This may result in faster workflow execution and less context switching for SAAS clients.

According to one aspect of the present invention, there is provided a software as a service (SAAS) platform comprising: a memory storing computer executable code to implement a plurality of service instances for execution on the SAAS platform, the computer executable code comprising a plurality of extension points; at least one processor for executing said computer executable code; for a software application registered on the SAAS platform and installed on at least one of the service instances, a script associated with at least one of the plurality of extension points, the script stored on the SAAS platform for execution on the SAAS platform; wherein during execution of said computer executable code for the at least one service instance, when the at least one of the plurality of extension points is reached: executing on the SAAS platform the script associated with the at least one of the plurality of extension point.

Optionally, the SAAS platform is an e-commerce platform, and each service instance is an online store.

Optionally the platform further comprises: an interface for registering the at least one software application on the SAAS platform.

Optionally the platform further comprises: an interface for uploading the script in association with the at least one extension point and in association with the software application registered on the SAAS platform.

Optionally the platform further comprises: a script manager configured to send the script to a front end device for execution by the front end device.

Optionally the platform further comprises: a script executor configured to execute the script.

Optionally the platform is further configured to determine whether the script is available for a particular extension point and for a particular service instance.

Optionally, the SAAS platform determines the script is available when: the script is associated with the particular service instance; and the software application is installed on the particular service instance.

Optionally the platform further comprises: a script execution selector that selects between executing the script on the SAAS platform and calling an API to execute code associated with the software application on an external hosting infrastructure.

Optionally, the script execution selector selects based on one or more of: capacity of the SAAS platform to execute the script; load balancing; fee structure; current performance of the external hosting infrastructure in executing the code; criticality of the software application set on a per-service instance basis; preferences set on a per-service instance basis.

Optionally the platform further comprises: for each of at least one extension point associated with the script, respective default logic stored in the memory that is executed for a given service instance when the software application is not installed for the service instance.

Optionally the platform further comprises: one or more data structures stored in memory containing: a list of available extension points; for each of a plurality of software applications, and for each of the available extension points, an indication of whether a script has been uploaded; for each service instance, an indication of which software applications are installed.

According to another aspect of the present invention, there is provided a method executed on a SAAS platform, the method comprising: executing computer executable code to provide a service instance in respect of which a third party application has been installed, the computer executable code including an extension point; wherein during execution of said computer executable code for the service instance, the extension point is reached, executing on the SAAS platform a script associated with the extension point and the third party application.

Optionally, the SAAS platform is an e-commerce platform, and the service instance is an online store.

Optionally the method further comprises: receiving input registering the third party application on the SAAS platform.

Optionally, the computer executable code includes a plurality of extension points, the method further comprising determining whether a script is available for a particular extension point and for the service instance.

Optionally, determining whether a script is available for a particular extension point and for the service instance comprises determining the script is available when: the script is associated with the particular service instance; and the software application is installed on the particular service instance.

Optionally the method further comprises: at least some of the time, selecting between executing the script on the SAAS platform and calling an API to execute code associated with the application on an external hosting infrastructure.

Optionally, said selecting is based on one or more of: capacity of the SAAS platform to execute the script; load balancing; fee structure; current performance of the external hosting infrastructure in executing the code; criticality of the software application set on a per-service instance basis; set preferences.

BRIEF DESCRIPTION OF THE DRAWINGS

Embodiments of the disclosure will now be described with reference to the attached drawings in which:

FIGS. 2A to 2K are examples of graphical user interfaces forming part of a developer user interface;

FIGS. 3A to 3C are examples of graphical user interfaces forming part of a merchant interface;

FIG. 7 is an example of a home page of a merchant, according to one embodiment.

DETAILED DESCRIPTION

Figure 1:
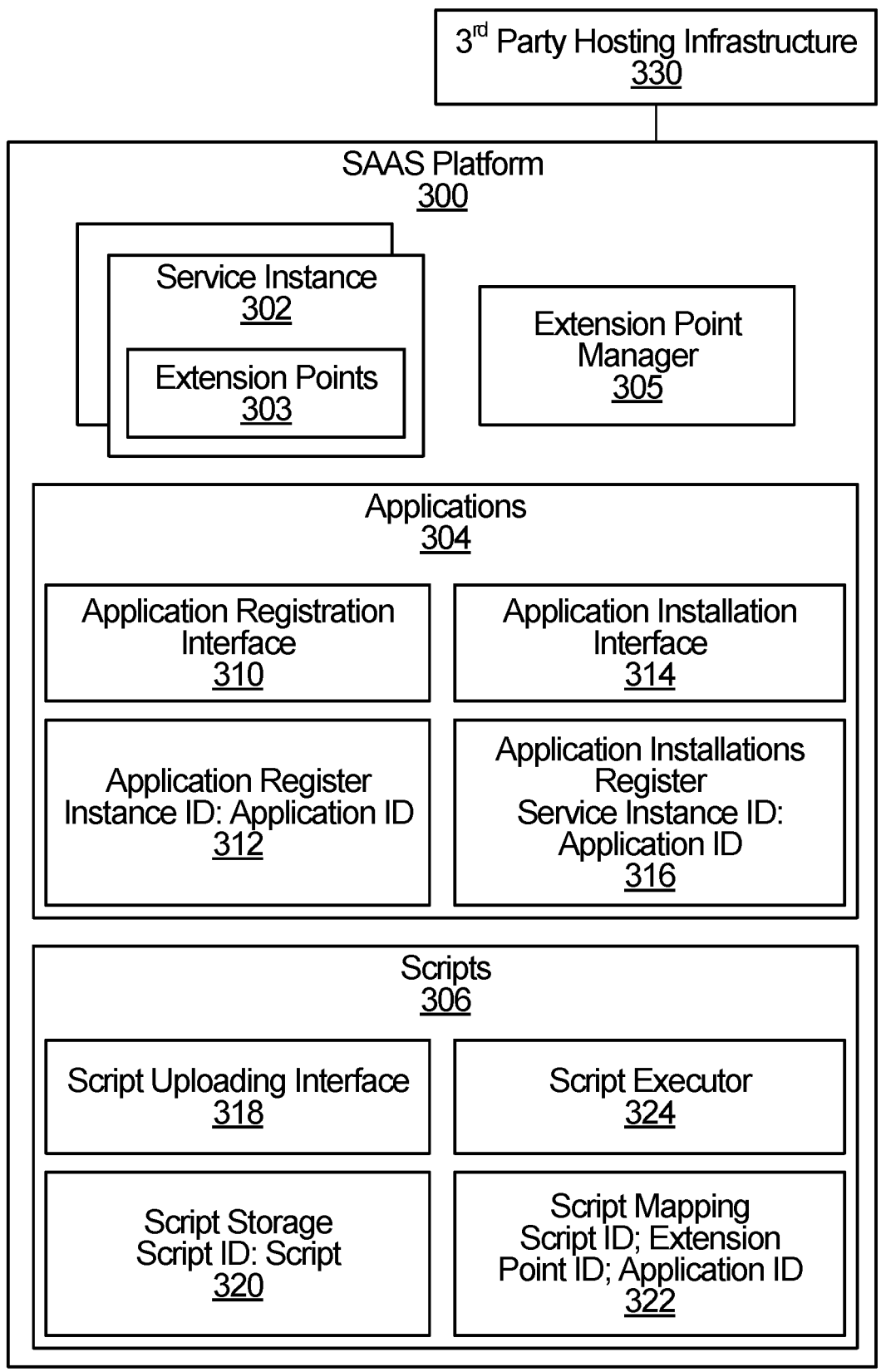
FIG. 1 is a block diagram of a SAAS platform provided by an embodiment of the application.

Referring to FIG. 1, shown is a SAAS platform 300 provided by an embodiment of the application. The SAAS platform is configured to implement service instances 302, a service instance being a set of functionality provided by the SAAS platform to a client of the SAAS platform. In a specific example, the SAAS platform is an E-commerce platform, and the service instances 302 are online stores implemented on the E-commerce platform. A detailed example of an embodiment of an E-commerce platform is described below with reference to FIGS. 6 and 7.

The executable code that implements the service instances 302 includes one or more extension points 303. Extension points 303 are defined inside the SAAS platform to allow the customization of functionality of the SAAS platform, and more specifically the service instances. Each extension point has a specified format that includes well defined inputs and outputs. A specific example of an extension point relevant to the E-commerce context is a shipping rate calculator extension point which has an associated set of inputs which might for example include product details and shipping address, and has an associated set of outputs that includes a shipping rate. An extension point manager 305, described in further detail below, is responsible for determining how to proceed once an extension point is reached during execution of code for a service instance. Any code that is to be executed for a given extension point must conform with the specified format.

The SAAS platform 300 has applications functionality 304 associated with applications that may be registered with the SAAS platform. In the illustrated example, this includes an application registration interface 310 for registering an application with the SAAS platform. For example, third party application developers may use this interface to register their applications. There is an application register 312 which associates each registered application with an application ID. There is an application installation interface 314 that is used to select which registered applications are to be installed against a given service instance. In the E-commerce context, the application installation interface 314 may be part of a merchant user interface, in which case personnel associated with an online store can use the application installation interface 314 to select which applications to install. An application installations register 316 maintains an indication of which application(s) are installed on (or registered against) which service instance(s).

The SAAS platform 300 has scripts functionality 306 associated with scripts to be executed on the SAAS platform. In the illustrated example, this includes a script uploading interface 318 for uploading scripts. Each script is uploaded in association with a specific application that is registered in the application registration interface 310 and a specific extension point within extension points 303. Typically, the source of the script is the same as the source of the application, for example an application developer or provider. The scripts are stored in script storage 320 together with a script ID for each script. In addition, a script mapping 322 is maintained. The script mapping 322 indicates for each script, the associated application and the associated extension point. There are many ways equivalent information can be maintained. For example, for each extension point, script mapping could indicate which applications have scripts for the extension point, and indicate the script ID of such scripts.

The scripts functionality 306 also has a script executor 324 which executes the scripts in the script storage 320. The script executor 324 is generally a processing capability within the SAAS platform. The script uploading interface 318 may also compile uploaded code received through the script uploading interface to produce the script in executable form for execution by the script executor 324.

Also shown, external to the SAAS infrastructure 300 is one or more third party hosting infrastructures 330 associated with one or more providers of the registered applications.

In operation, service instances 302 are used to deliver SAAS services to clients. Typically, each service instance is associated with a respective client, although a client may be associated with or have multiple service instances. In the E-commerce context, a client would typically be a merchant.

Third party application developers develop applications for registration on the SAAS platform 300, and register these through the application registration interface 310. When this takes place the application register 312 is updated to indicate the application has been registered, and the application ID of the application. Once an application is registered with the platform, it is available for installation (or registration) against a service instance 302. Through the application installation interface 314, a client can select which registered application(s) to be installed against the client's service instance 302.

In addition, application developers, for example the third party application developers, may develop scripts to provide customized functionality in association with a specific application, and in association with one or more of the available extension points 303. Each script is developed in conformance with the format of the associated extension point. For example, the inputs to the script and outputs produced by the script should match those of the associated extension point.

These scripts are uploaded through the script uploading interface 318 which results in their storage in script storage 320 together with a script ID for each script. The script mapping 322 is updated to include a record for the script indicating the associated extension point(s) and the associated application ID.

During the execution of a service instance 302, for example while a merchant or customer accesses an online store, the application(s) installed against the service instance are known from the application installation register 315. When one of the extension points 303 is reached, the extension point manager 305 is invoked to determine how to proceed. The extension point manager uses knowledge of which application(s) are installed against the service instance, together with the script mapping 322 that refers to the extension point, to identify any script ID(s) associated with the extension point, and associated with an application that is installed against the service instance. When a script ID is identified, the extension point manager 305 causes the script having the identified script ID to be executed by the script executor 324 to provide the custom functionality of the script. In some implementations, in contrast to conventional approaches where some or all of the code written by an app developer may be executed on third party hosting infrastructure, the execution of an application script by the script executor 324 can be done without the need to call the application through an API to access the script functionality and without the need to rely on the third party hosting infrastructure 330. In some embodiments, when no such script is available, default logic provided within the SAAS service instance for the extension point is executed.

In the illustrated embodiment, the extension point manager 305 determines where a script is available based on the extension point ID and the service instance ID. Based on the service instance ID, the extension point manager 305 can determine what applications are installed for that service instance from the application installations register 316. Then, with knowledge of which applications are installed, the extension point manager 305 consults the script mapping 322 to determine if there is an entry in the mapping for the specified extension point for one of the applications installed, and if so obtains the script ID for the entry, and instructs script executor 324 to execute the identified script. In some embodiment, where there is no such entry, default functionality is executed.

By implementing the custom functionality at an extension point, application specific functionality, provided in the script from the application developer, is executed on the SaaS platform's hosting infrastructure when the extension point is reached. The described approach allows for 3rd party customization using scripts that run on the SAAS platform, and in some cases, benefit from the scalability/volume handling capabilities of the SAAS platform, and avoids the risks associated with insufficient capacity in an app's hosting infrastructure.

Developer User Interface (UI)

In some embodiments, a developer UI is provided. The developer UI provides developers with a current list of the available extension points, and details of the relevant format for each extension point. In addition, the developer UI provides a platform for a developer to develop and upload a script in association with a specific application and a specific extension point. The above-described application registration interface 310 may be part of the developer UI, and the above described script uploading interface 318 may also be part of the developer UI. In some embodiments, the developer UI also includes functionality to validate scripts before uploading and making them available for execution.

In some embodiments, a performance dashboard is presented through the developer UI indicating the performance of registered apps, in terms of how widely it is being used, uptime/downtime, latency etc. in some embodiments, where the performance of a registered application is poor, as defined by certain metrics, a recommendation is made through the developer UI to create and upload one or more scripts as described above to address the latency/performance issues.

Figure 2A:
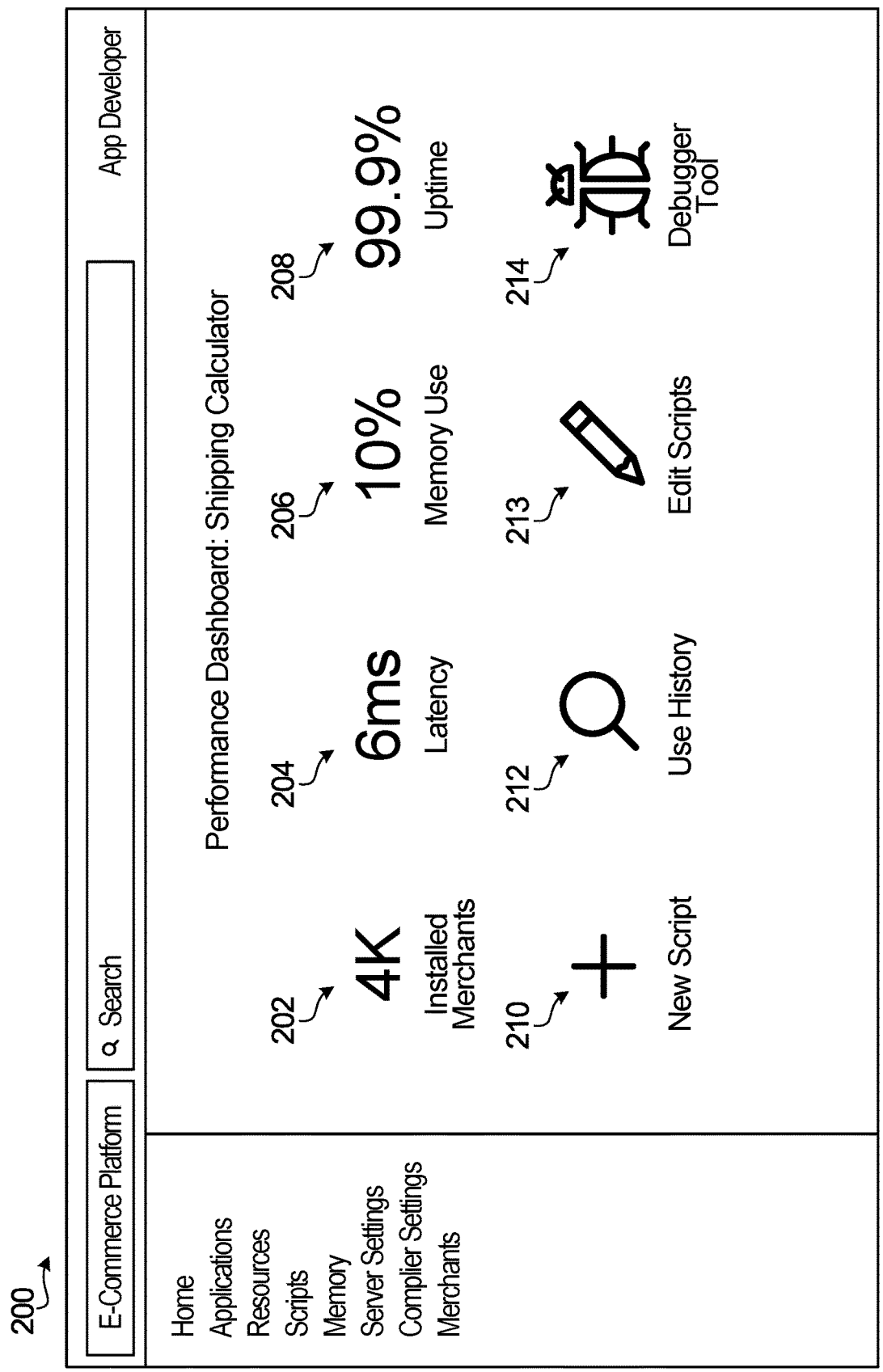

FIG. 2A is an example user interface 200 of a performance dashboard, according to one embodiment. The performance dashboard which may be a service instance running on and hosted by the SAAS platform, highlights a number of statistics and presents controls for developer use. According to this embodiment, the performance dashboard is for developers developing scripts or applications for use with a SAAS platform that is an e-commerce platform, but a similar approach can be used for other types of SAAS platforms. At the instant depicted, the dashboard is showing information and options in respect of a Shipping Calculator application; where the same application provider has multiple apps registered on the SAAS platform, the performance dashboard allows a selection of one of these applications, or a new application.

The dashboard includes an indication 202 of how many merchants (i.e. service instances) have installed the application (in this case, the number of merchants who have installed the Shipping Calculator app), latency or average response time 204, memory use 206, and uptime 208. The dashboard further has controls for a developer to create a new script 210, view the usage history of the script 212, edit scripts 213, and open a debugger tool 214.

The statistic indicators 202, 204, 206, and 208 may be generated by a server (e.g. within the SAAS platform) making a query over the network to a database storing the information. According to some embodiments, the statistics may update automatically.

The performance dashboard also includes a set of controls that, when activated (e.g. by a developer user), perform a variety of actions related to scripts.

New script control 210 instructs the performance dashboard to send a request to the server to start a new script. This redirects the developer electronic device to a new window to write a new script or upload a script written outside of the SAAS platform.

Use history control 212 instructs the performance dashboard to redirect the developer electronic device to a page to view specific application statistics or use cases. This can be used to investigate strange activity or performance of the app.

Edit scripts control 214 instructs the performance dashboard to send a request to the server to edit a script that has previously been uploaded to the SAAS platform.

Debugger tool 214 instructs the performance dashboard to redirect the developer electronic device to the debugger tool. The debugger tool allows the developer to run the script under supervised and managed conditions in order to track the code operations and monitor changes in computer resources that may indicate malfunctioning code.

More generally, in some embodiments, the developer UI allows an application developer to create scripts, find out if a shop or business has his/her application/script enabled, and in what capacity, edit/delete previously uploaded scripts.

Figure 2B:
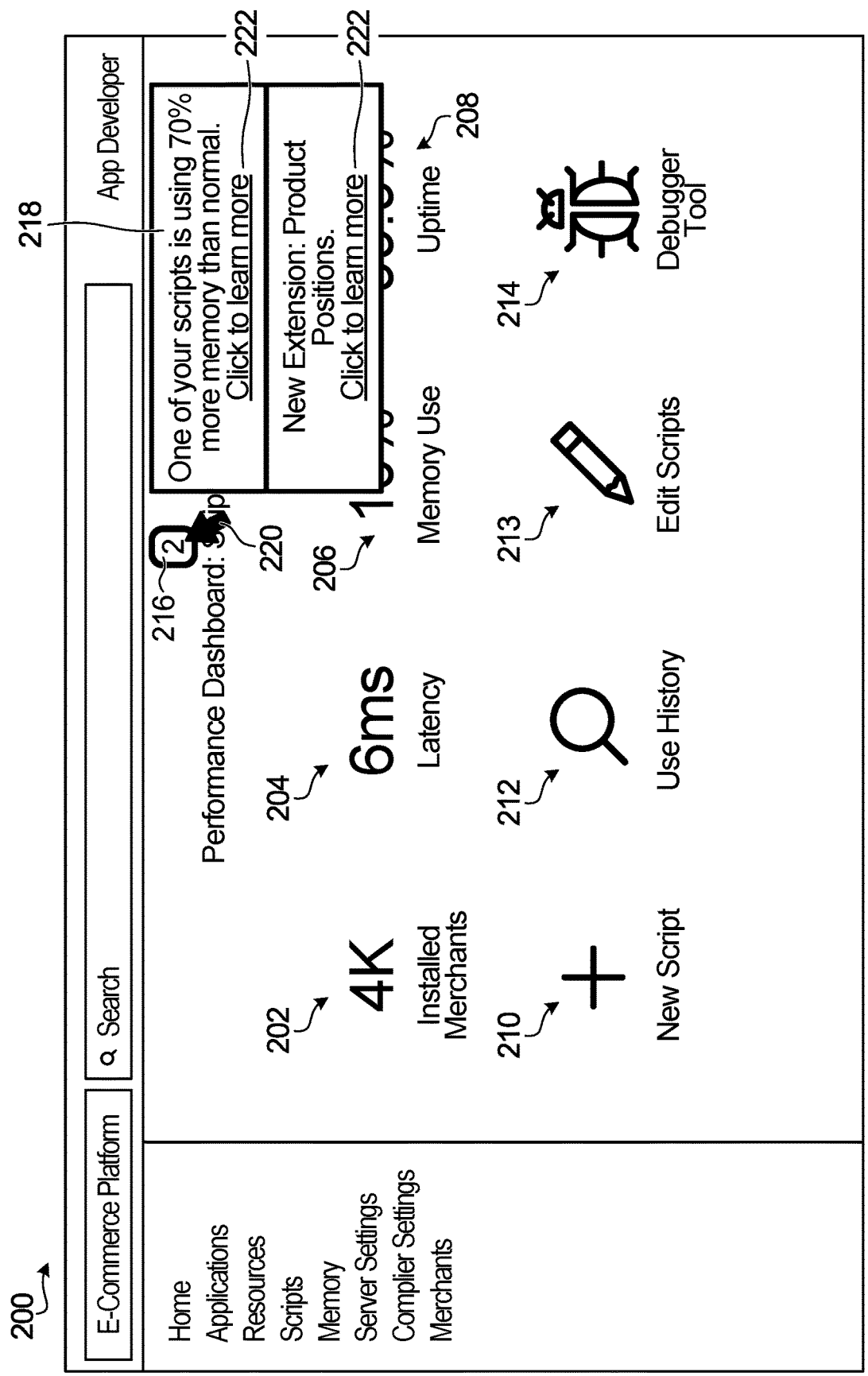

According to some embodiments, as shown in FIG. 2B, the performance dashboard can generate and provide notifications 216.

A notification 216 may be generated if a monitored statistic exceeds a predefined or relative threshold. Using a cursor 220 to hover over the notification 216 can cause the display of a tooltip 218. The tooltip 218 can describe the notifications 216, and may include links 222 to direct the user to more information.

For example, in FIG. 2B, there are two notifications 216 generated in the performance dashboard. One of the notifications indicates that a script is using 70% more memory than normal. This is also indicated in memory use statistic 206. Clicking on the link 222 for this notification would redirect the developer to a user interface showing memory use and time, providing a snapshot to better determine why the use met a threshold.

According to some embodiments, as shown in FIG. 2B, the notification 216 can also include news or updates about the developer system, such as new extension points available for developer use. Clicking on link 222 for this notification would direct the developer to more information about this new extension point.

Figure 2C:
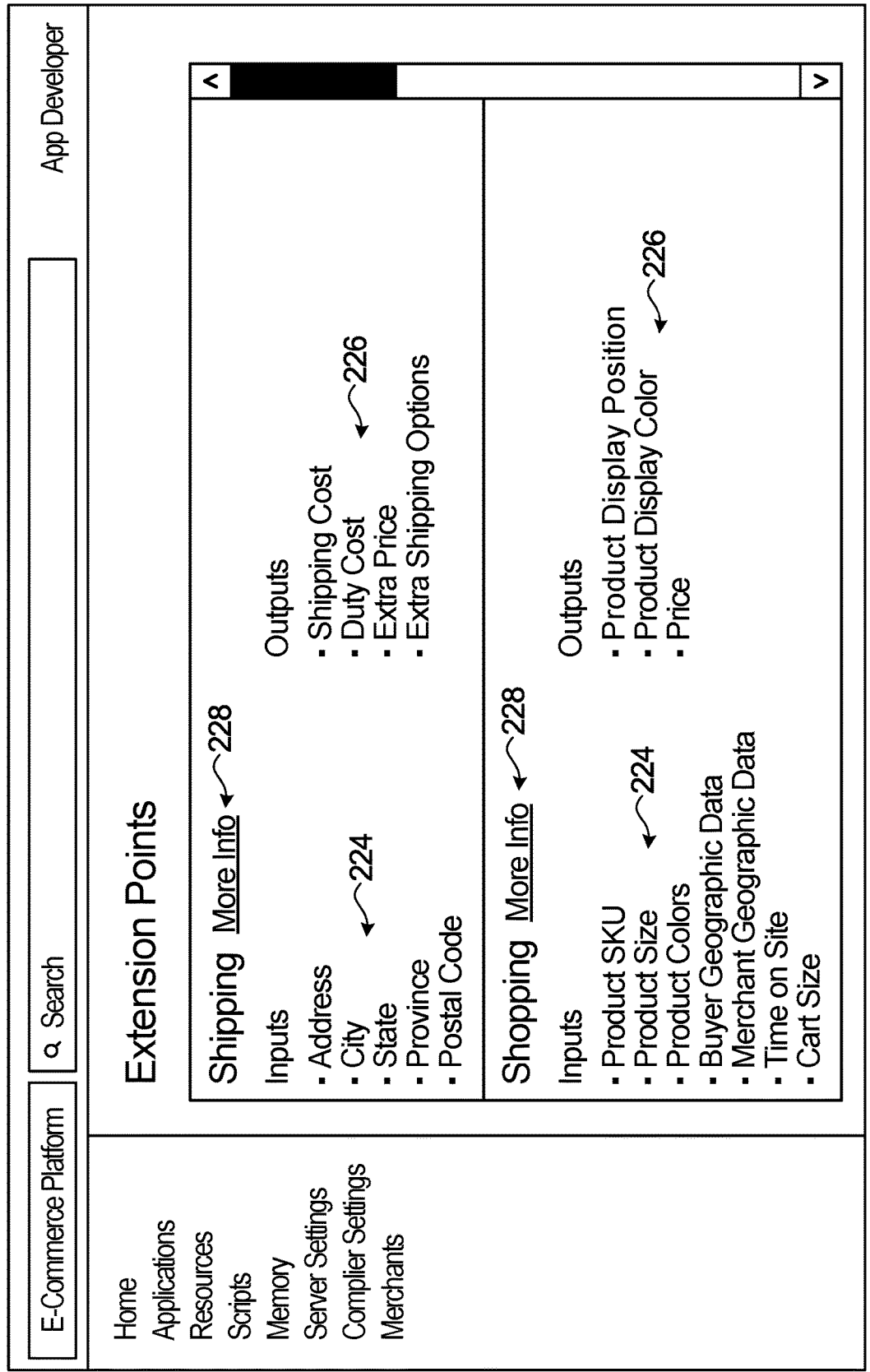

FIG. 2C is a user interface 223 to show extension points for developer use. As previously described, an extension point has associated format including specified inputs and outputs. Shown are two specific examples of extension points, namely "Shipping" and "Shopping". Each extension point has associated inputs 224 and outputs 226, with a control 228 to direct the developer to more information about the inputs 224 and outputs 226.

Interfacing with control 228 to show more information about the extension points will redirect the developer to FIG. 2D, a user interface 229 showing more details of the inputs and output of a specified extension point. For each input 230, the user interface 229 shows the syntax or name 232 of the variable for developer use. For each output 234, user interface 229 shows the format (i.e. data type, class, struct, etc.) 236 for the output. For example, to access the zip code of an address, the developer would use the syntax 'zipUSA'. To return a value for output Duty, the developer must provide a value in the form of data type 'moneyAmount'. Clicking on syntax 232 can direct the developer to more information about the format of each individual input. Similarly, clicking on the format 236 for each output can direct the developer about more information about the data types.

In some embodiments, the user interface showing information about extension points is presented in the form of an API reference, e.g.:

https://shopify.dev/docs/storefront/api/reference/mutation/checkoutgiftcardsappend together with a specific definition of the names and data types of each input (argument/variable), and a specific definition of the data type of each output (return type). Optionally, a description of each field would also be shown or otherwise made available through the interface.

Figure 2E:
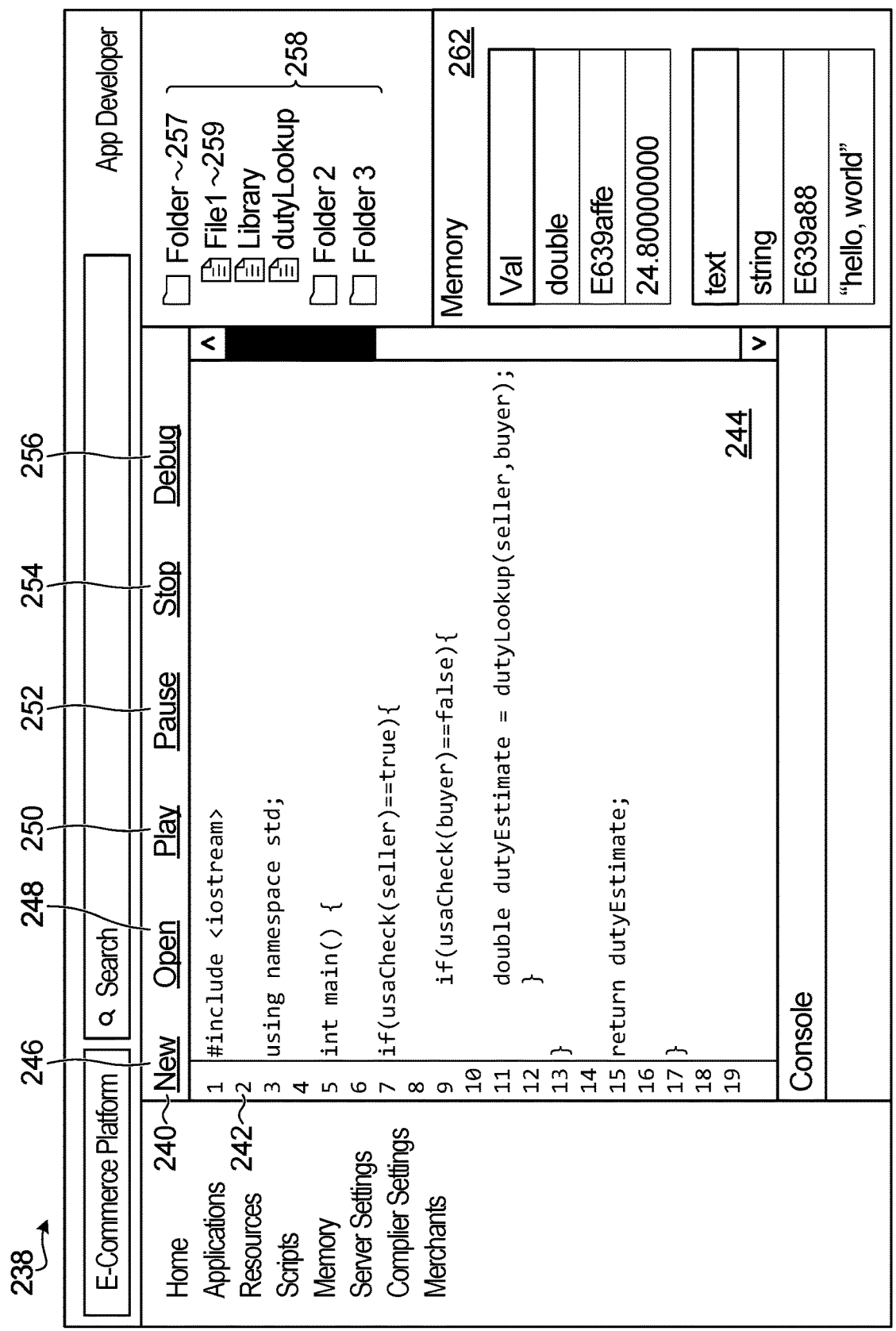

FIG. 2E is an example user interface 238 of a development platform for writing scripts to be used in a SAAS platform, according to one embodiment. According to this embodiment, the developer is presented with a coding window 244, console output 260, file explorer 258, and memory watch 262. The coding window 244 includes line numbers 242 and controls 240. Controls 240 include new code control 246, open code control 248, play code control 250, pause code control 252, stop code control 254, and debug code control 256. File explorer 258 includes folders 257 and individual files 259 inside each folder 257.

In operation, developers may use coding window to write code for their scripts. The scripts may have access to the input variables and generate outputs for any specific extension. According to some embodiments, coding can be done by writing syntax. According to other embodiments, coding may be done by using a visual representation and functional blocks. In some embodiments, for a specific extension point, a template script is prepared which has the necessary format, in terms of the expected inputs and outputs for that extension point.

Memory watch 262 is a tool to allow developers to keep track of variables, their addresses in memory, and the values. A developer can identify a variable and the memory watch 262 will keep track of the variable on the display.

New code control 246 will instruct the development environment to create a new code file from scratch. Open code control 248 will prompt the user to upload a new code written outside of the coding environment. Play code control 250 will cause the system to run the code in the coding window 244. Using pause control 252 and stop control 254 after play control 250 will cause the development environment to pause or stop the code respectively. The debug code control 256 will launch the debug tool. The debug tool allows the developer to run the script under supervised and managed conditions in order to track the code operations and monitor changes in computer resources that may indicate malfunctioning code. A debug tool can include the ability to step through code one or more line at a time to identify problems. The debug tool, in conjunction with memory watch 262 allow the developer to best understand how their script operates.

Figure 2F:
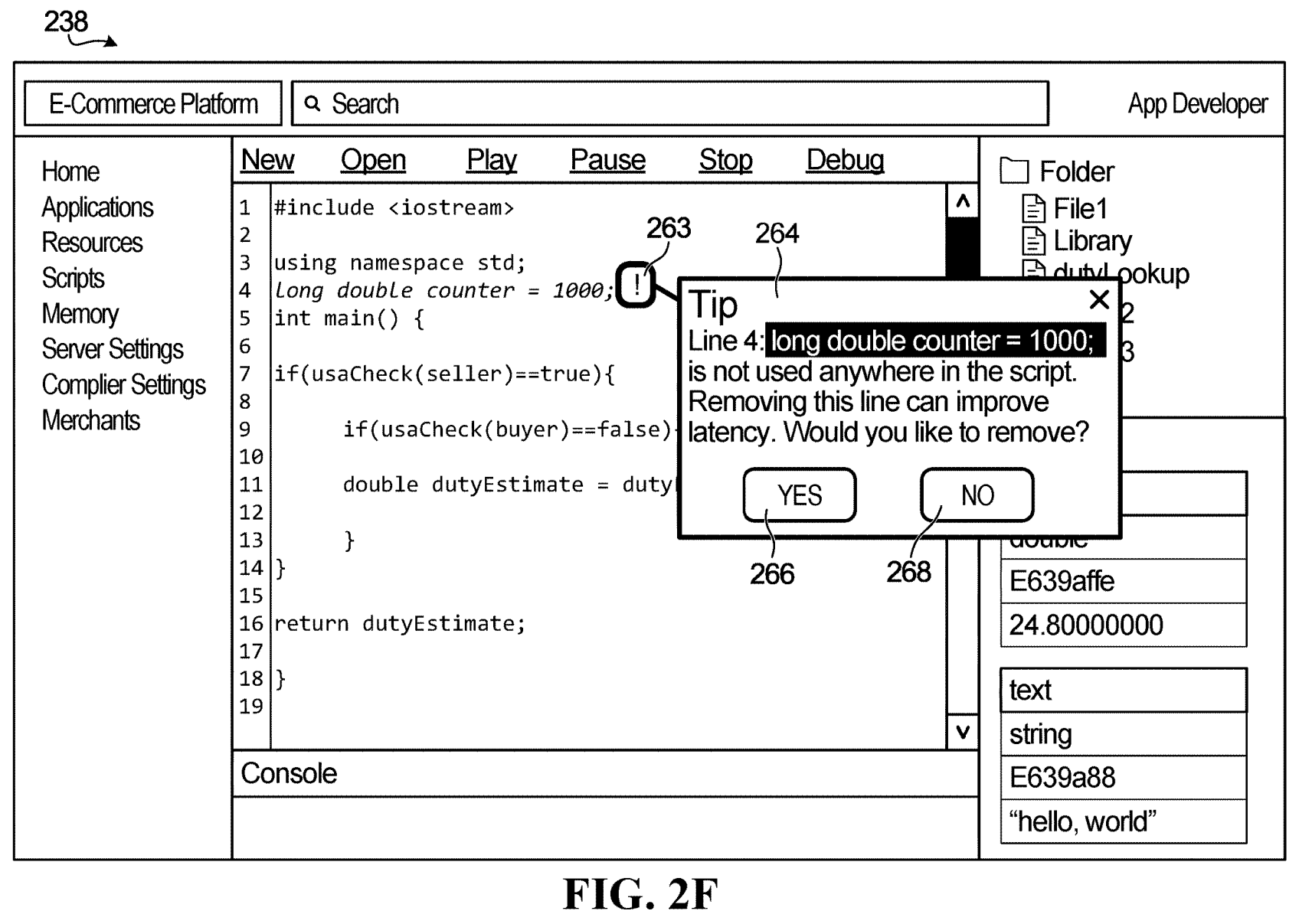

According to some embodiments, as shown in FIG. 2F, the development environment can generate notifications 263 about the code in coding window 244. Hovering over the notification 263 brings up tooltip window 264, which can generate a suggestion about the script, and controls 266 and 268 to implement a proposed solution.

For example, in FIG. 2F, the developer environment has determined that line 4 is unnecessary in the operation of the script. Therefore, the system recommended removing the line of code in order to increase processing speed. Other examples of problems identifiable in the code could be excessively heavy computations, variable types that are larger than necessary, or large looping structures. The system offers control 266 to remove the unnecessary code, and control 268 to keep the code in.

Using open code control 248 can open an upload new file window 270. Upload new file window 270 includes a file path input 272, title input 274, and location input 276. Upload button 278 will upload the file located at file path input 272 to the location 276 and save the file with title as specified. File path input 272 may be a location on a local developer computer, on a local developer server, on a remote computer, or a remote server. Uploading using upload control 278 will copy the file from the file path location and save it on a memory on a server accessible to the developer environment for access and modification.

Figure 2G:
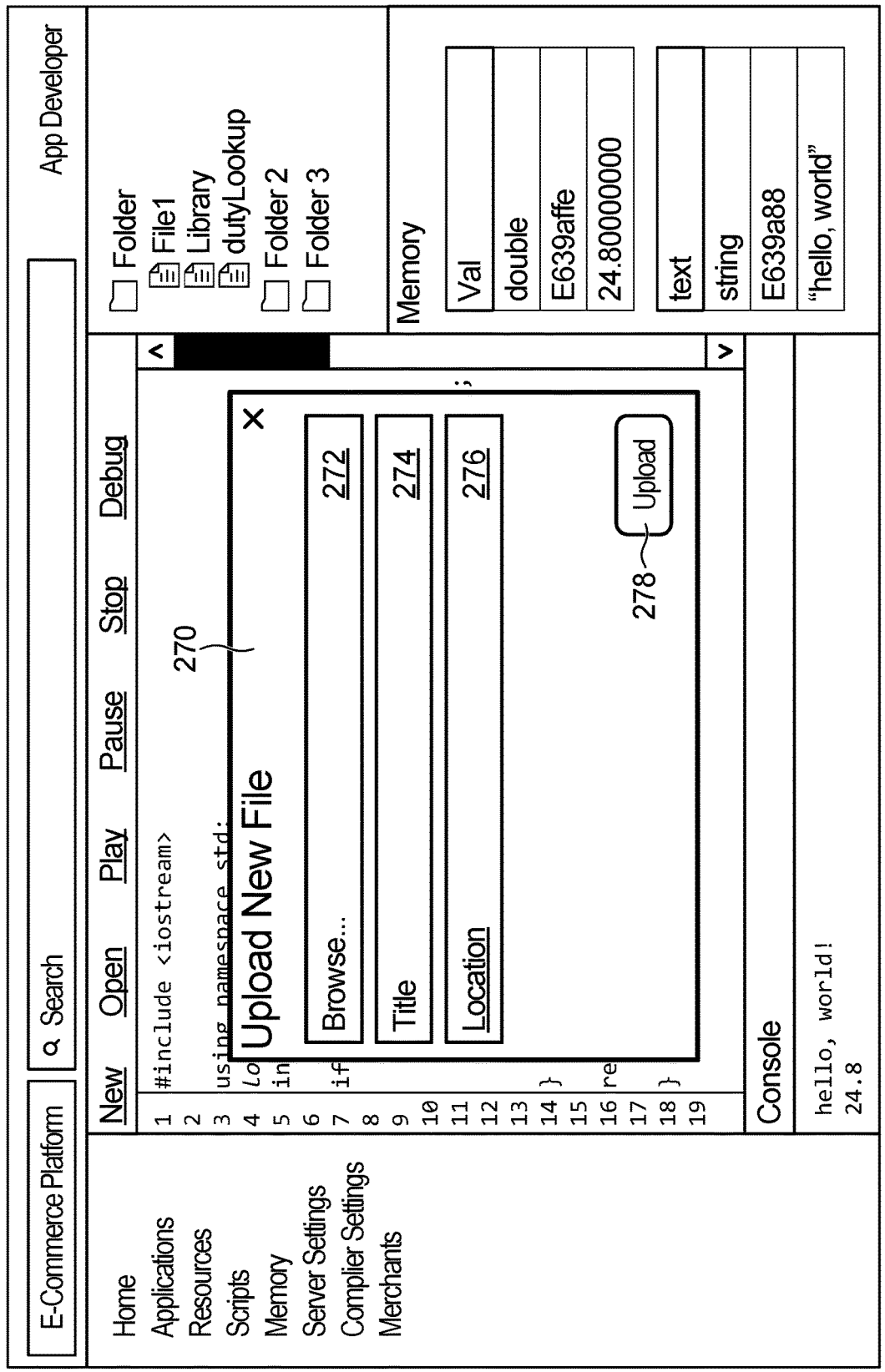
Figure 2H:
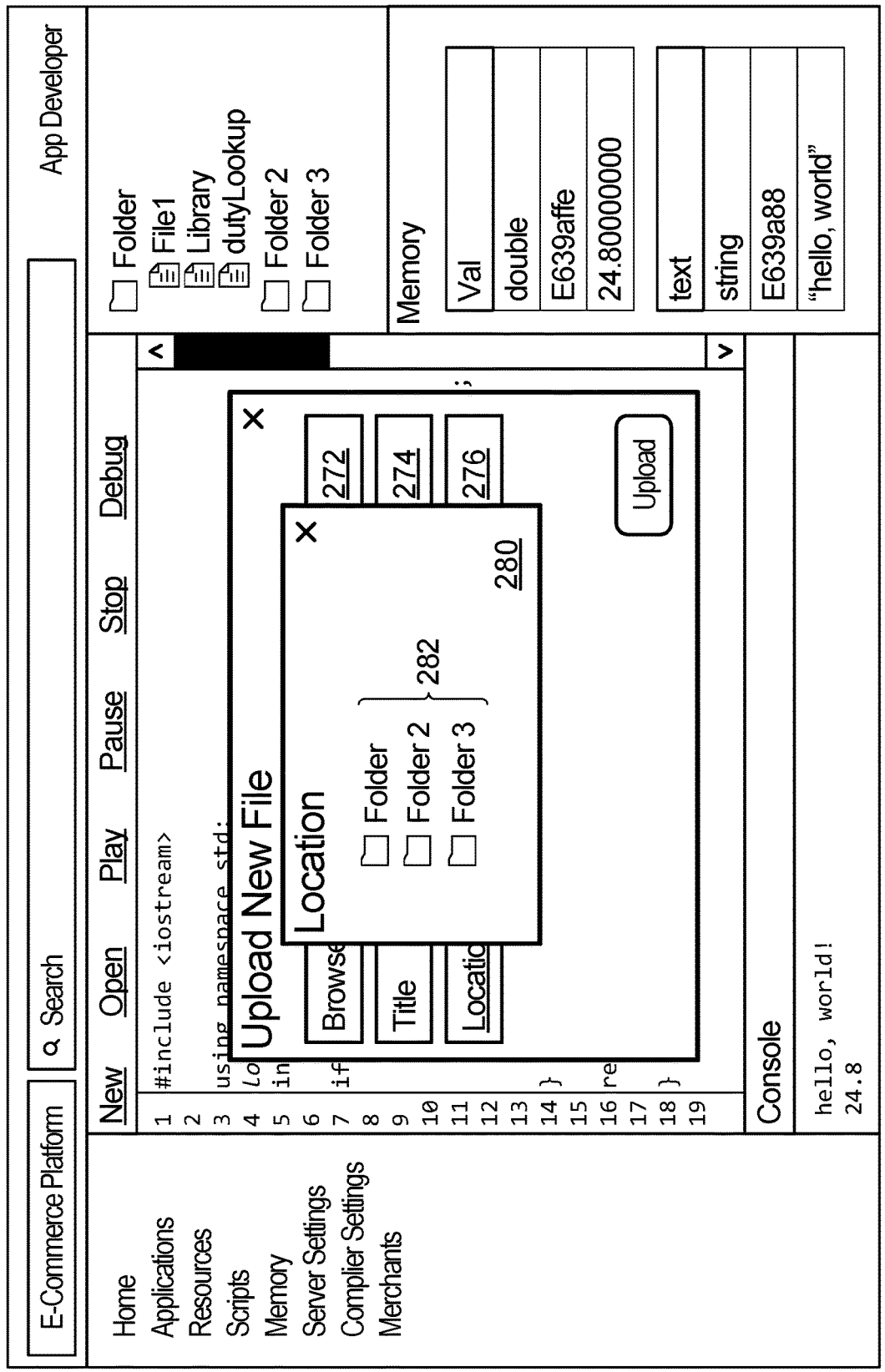

Turning to FIG. 2H, according to some embodiments, the system can save files to specific locations. By selecting location 276, a location window 280 can provide the user with a specific folder 282 to save a file to.

Figure 2I:
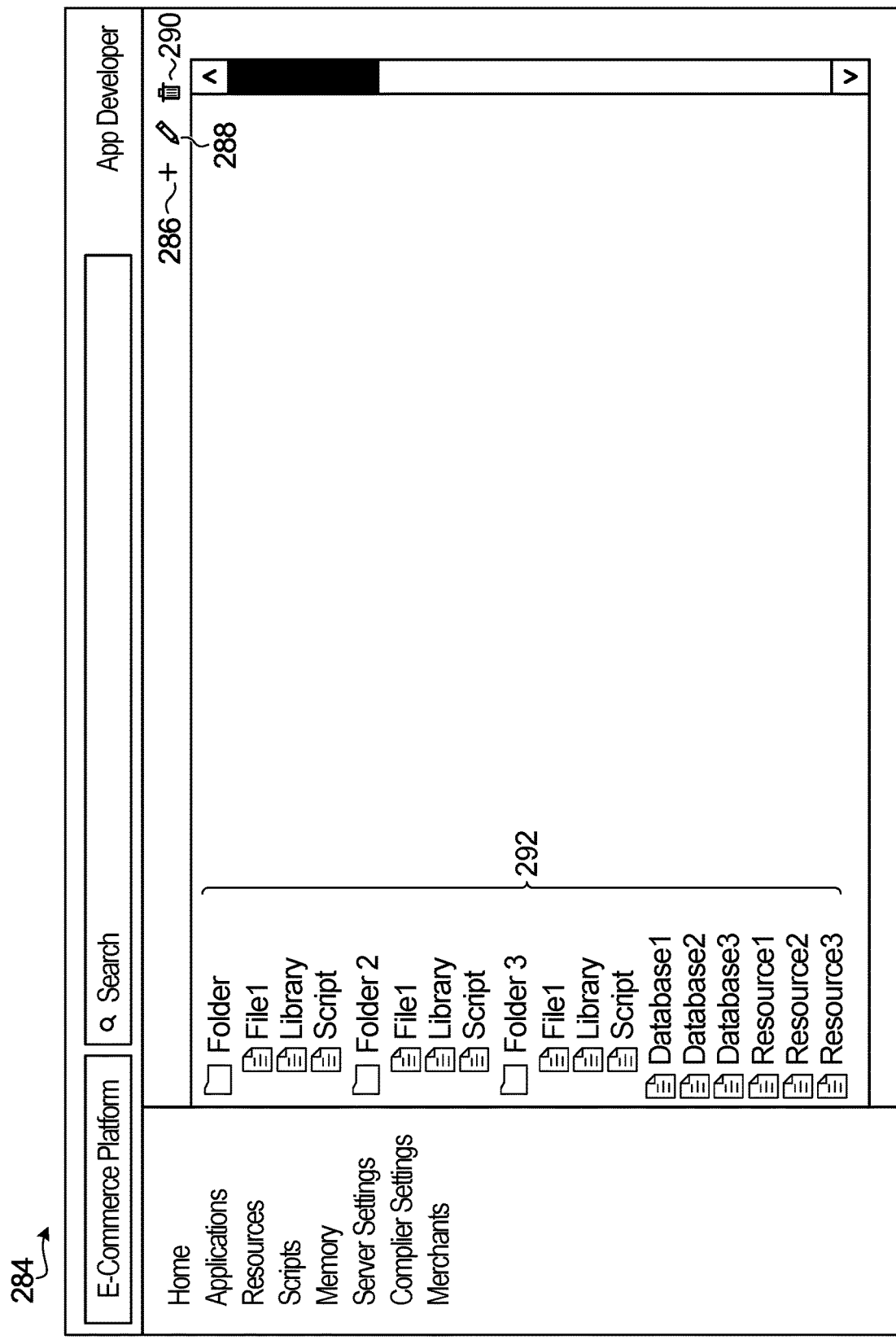

FIG. 2I shows an example user interface 284 for a file explorer. The file explorer shows the titles of all folders and files 282. A developer can select a specific file or folder 292 and use commands to interface with the file. Using add file control 286, the developer can create a new file or upload a new file using a window similar to that shown with reference to FIG. 2G. Edit control 288 will open the file selected in the development environment shown in FIG. 2E. Finally, delete control 290 will delete the file from a memory on the server.

Figure 2J:
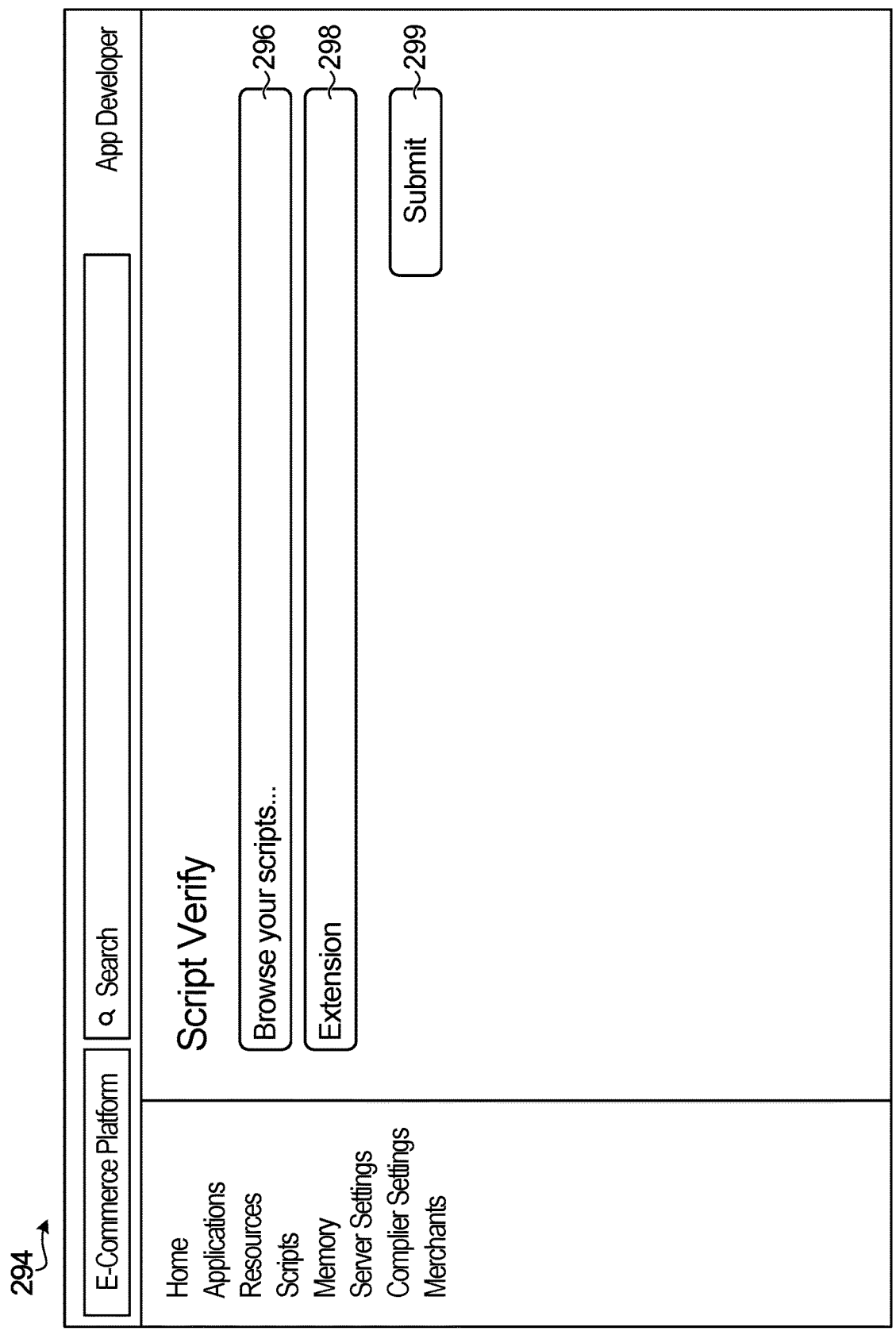

FIG. 2J shows an example user interface 294 for verifying a script. A script may be verified to ensure the code meets the standard for widespread use within the SAAS platform. Verification can be done automatically (by an inspection script) or manually (by another developer), or in combination. The interface 294 includes an input for the script 296 and extension 298. The developer must select the script to submit for verification, and the extension point for which the script is written if the script is associated with more than one extension points. The developer may then use submit button 299 to send the script for verification.

Figure 2K:
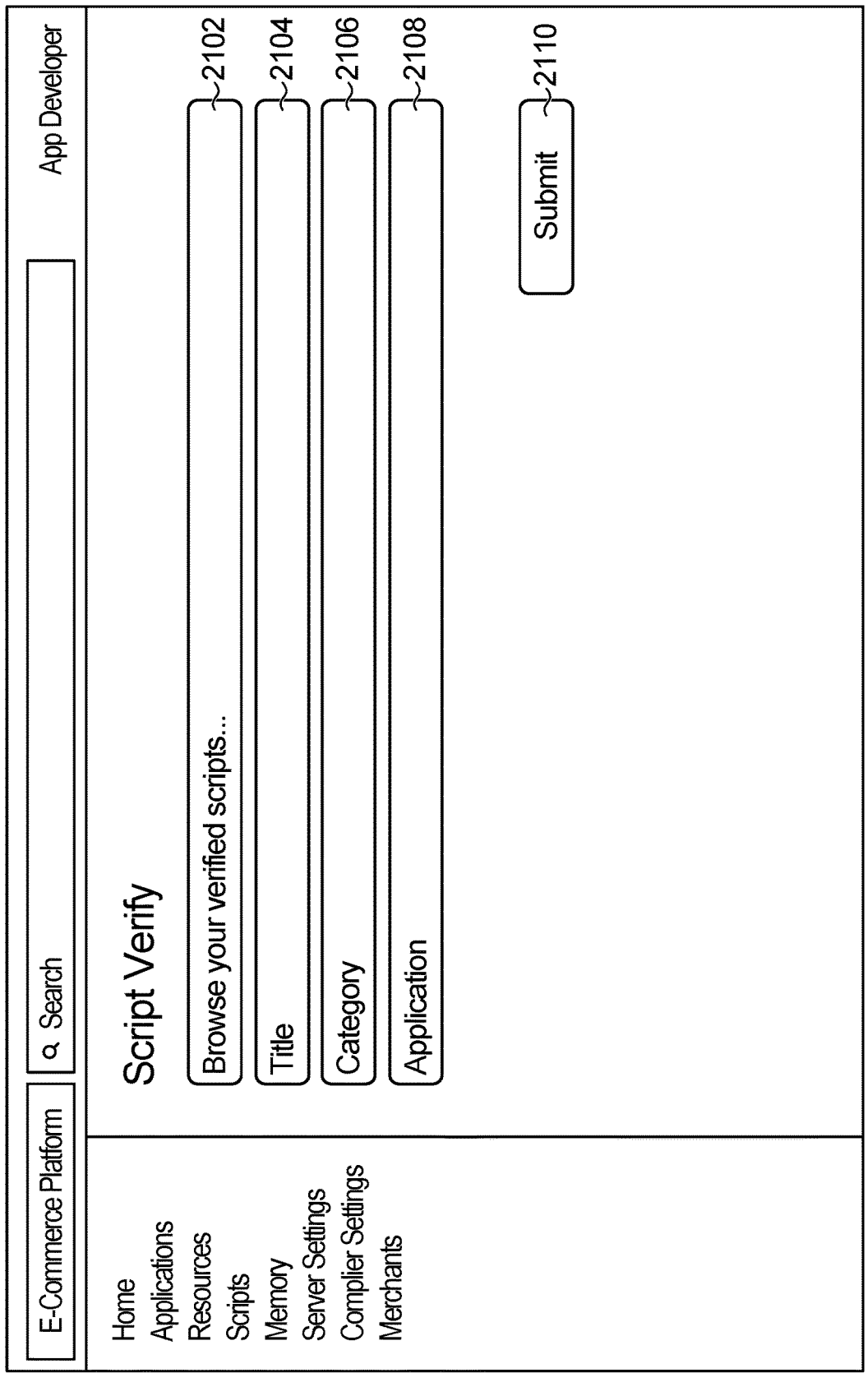

FIG. 2K shows an example interface 2100 for uploading a script. This can be viewed as an example of the script uploading interface 318 of FIG. 1. Once a script has been verified, the script can be uploaded and stored, in association with a specific application and a specific extension point. Once that is done, the script will be available to SAAS clients that have installed the associated application. The user can use the script field 2102 to select a verified script, write a title in title 2104, identify a script category 2106 and application 2108. The developer can then use submit button 2110 to distribute the script with title 2104 for the application 2108 in category 2106.

In some embodiments, a client UI is provided. In the e-commerce case, this would be a merchant UI. In some embodiments, the client UI presents or displays application recommendations. The client UI includes a search option for the client to conduct a search for registered applications. The search results indicate for each application whether it is script-enabled, in the sense that at least some of the application's functionality is implemented through scripts running on the SAAS platform. The search results may also provide and display historical performance for each application and/or other information relevant to each application. Other specific examples include historical uptime/downtime, security information (no external calls), regional privacy (no calls outside of a given region, etc.). The information displayed may be based on client preferences.

The client UI allows a user to select an application for installation, to enable an installed app, and to uninstall or disable a previously installed app. The above described application installation interface 316 may be part of the client UI. In some embodiments, the client UI includes an option for the client to set a criticality of the application.

For a script that can be run on the SAAS platform, or the 3rd party hosting infrastructure, a selection of where to run the script can be made taking into account the criticality setting, with scripts for more critical apps running on the SAAS platform where performance can be guaranteed. More generally, the client UI may include functionality for a client to configure conditions on when to run a given script on SAAS platform (for example during high volume times) or on the 3rd party hosting infrastructure (for example during low volume times).

In some embodiments, the client UI also displays application and/or script performance for applications installed for the client, and the scripts used by those applications.

In some embodiments, the SAAS platform, based on the health, performance and/or latency of a first application, determines if there is another application of similar functionality with one or more scripts running on the e-commerce platform which may provide an improvement in health, performance and/or latency. When this is the case, the system may recommend the other application to all clients using the first application. This recommendation may be made through the client UI.

Figure 3A:
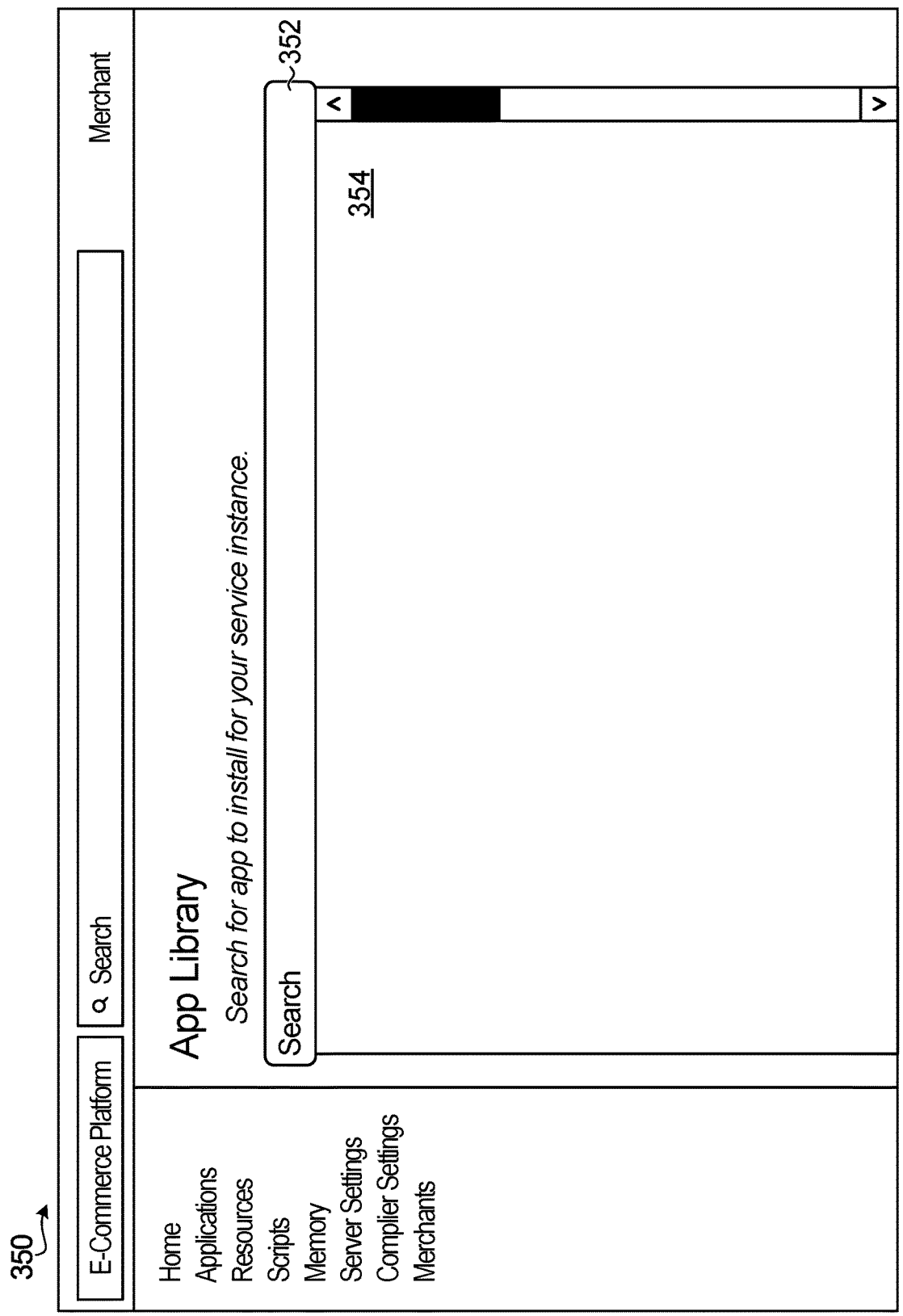

As shown in FIG. 3A, a user interface 350 forming part of a client UI is provided for the client to search through a library of apps. The client may use a search text field 352 for keywords, and based on the input, results field 354 will populate. The results may be based on a query of a database of apps.

Figure 3B:
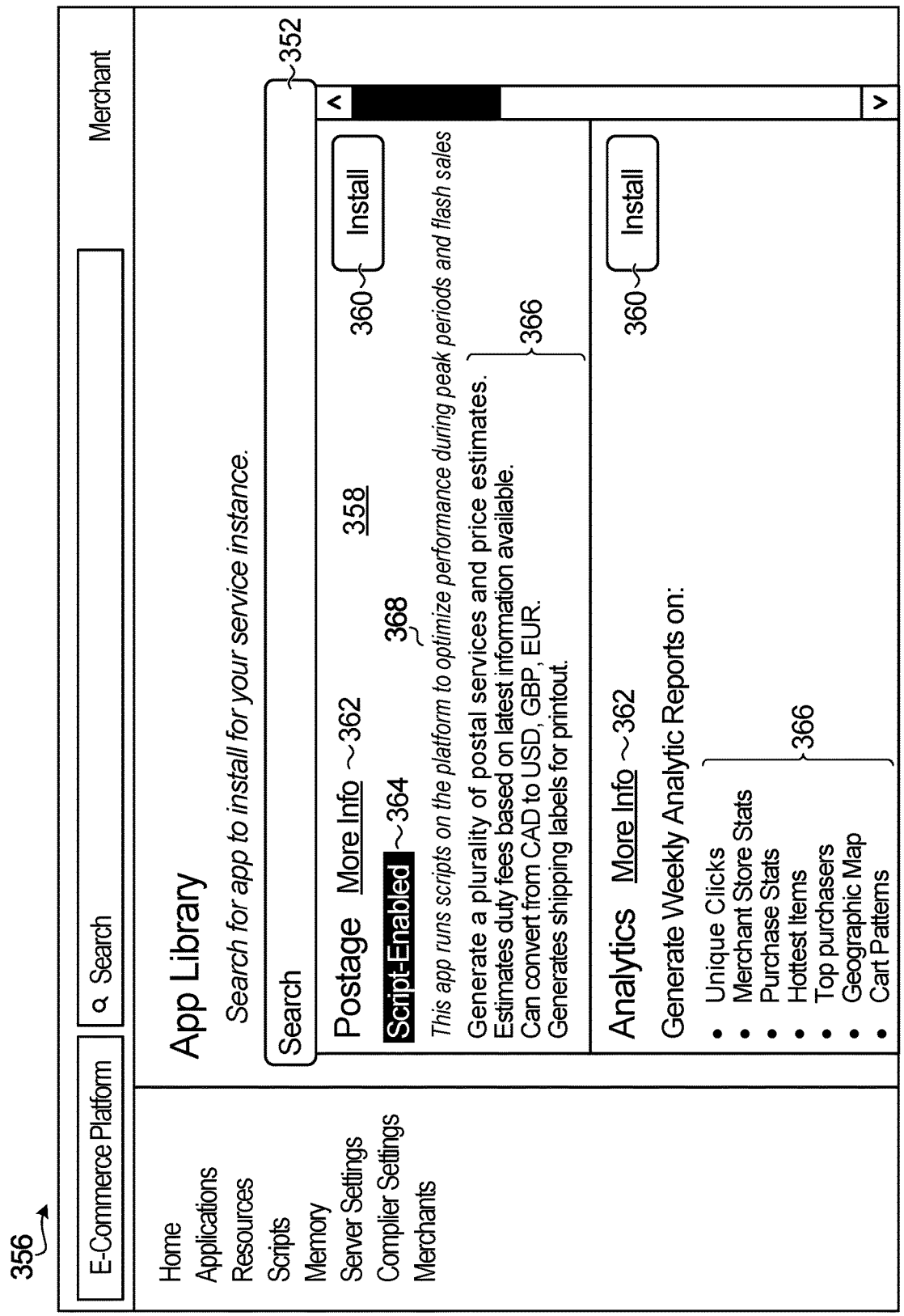

FIG. 3B is an example interface 356 forming part of the client UI for the SAAS platform to present application recommendations 358 to a client (such as a merchant). The interface 356 includes a description 366 for the specific application and a control 362 to access more information about the application. The interface 356 includes a control 360 for installing the application into the client's service instance system within the SAAS platform.

If one or more scripts have been uploaded in association with the application for execution on the SAAS platform as detailed above, the interface 366 will provide an indication 364 that the application is script-enabled, and can also provide a description 368 of what a script-enabled application means. It may be preferred by a client to be able to install a script-enabled application to avoid the potential problems associated with applications that are not script-enabled.

FIG. 3C is an example user interface 370 forming part of the client UI for configuring a script-enabled application, according to one embodiment. The interface includes an indication that the application has already been installed 372 and a current application health indication 374 in terms of current latency.

In some embodiments, if there is a script available for an installed application, the script is always used and executed on the SAAS platform. However, in other embodiments, the script may still run on the $3^{rd}$ party infrastructure in some circumstances. In the illustrated example, the interface 370 includes a threshold field 376 for setting a high volume threshold on sales per hour. Other metrics can alternatively be used. Based on this threshold, the client can determine when to offload the script from within the $3^{rd}$ party platform and onto the SAAS platform using field 378 to set a preference for where to execute the script when the threshold is exceeded, and using field 380 to set a preference for where to execute the script when the threshold is not exceeded. In another embodiment, not shown, the client UI, can set a percentage of time/executions that the script should be run on the SAAS platform resources.

In some embodiments, a client UI makes available a list of applications that have been registered, and the associated scripts. The client UI may allow a client to query of script runs for the client's service instance, for a specified time period.

Figure 4:
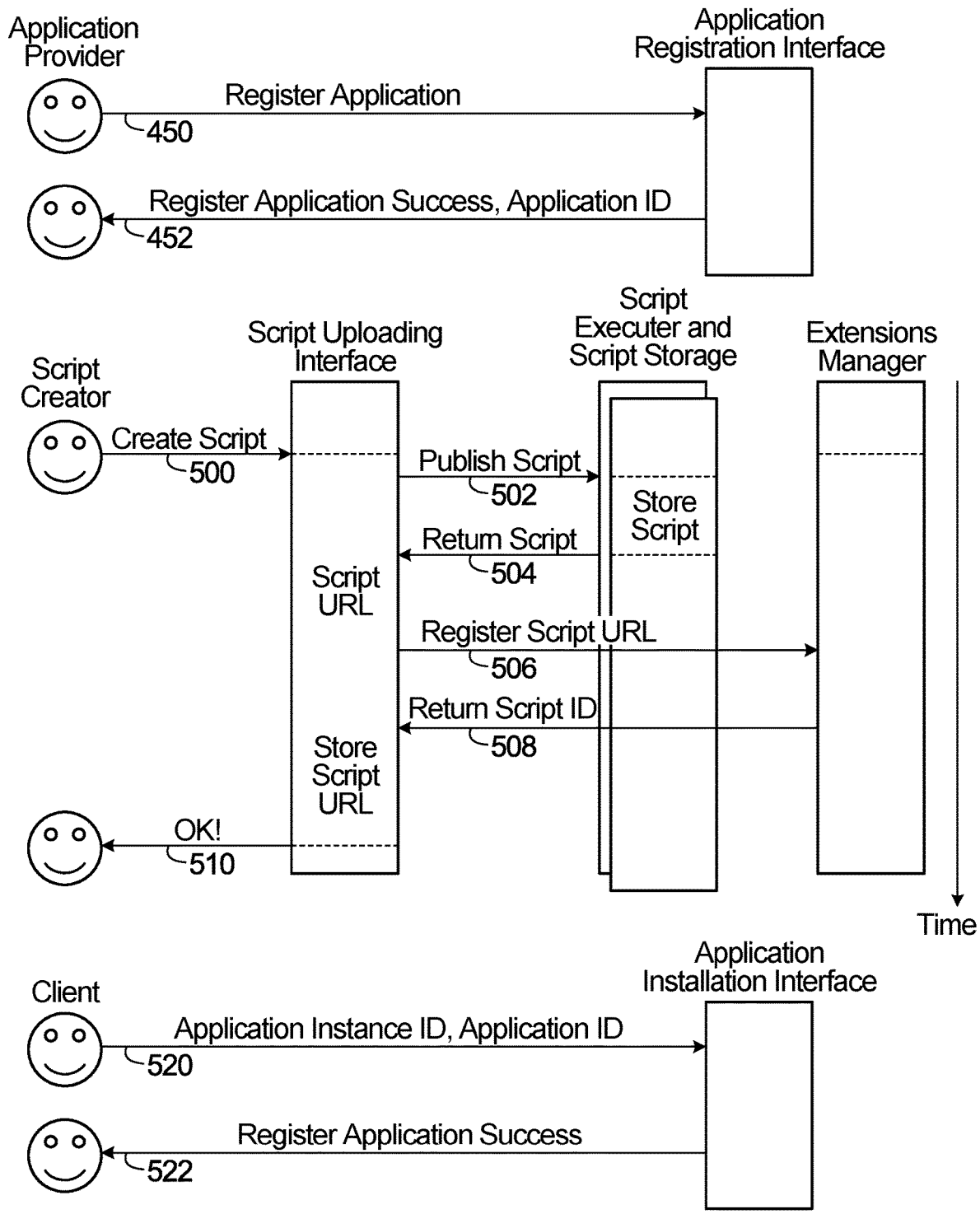
FIG. 4 shows an example of an overall setup process including application registration, script creation, and application installation against a specific service instance, using the components of FIG. 1.

FIG. 4 shows an example of an overall setup process including application registration for example though an application registration interface, script creation for example through a script uploading interface, and application installation against a specific service instance for example through an application installation interface, using the components of FIG. 1.

First at 450, an application provider registers an application with the SAAS platform through the application registration interface. Upon success, the application registration interface returns an application registration success indication at 452 together with an application ID of the registered application.

Next, at 500, a script creator creates a script in association with a specific extension point using the script uploading interface. The script is also in association with a specific application. In some embodiments, the script creator accesses the script uploading interface using credentials, and specifies an application ID for which a script is being created. The script uploading interface may present to the script creator a list of extension points, and the associated inputs and outputs.

The script uploading interface validates the script and publishes the script to the script storage. If any type-specific compilation is required (for example, generating an executable module from a TypeScript file), that may happen here as well.

At 502, the script uploading interface will deploy this compiled version of the script to script storage 320 via script executor. At 504, the script executor returns a URL for the compiled version of the script which the script uploading interface can store in a script URL database.

Next, at 506, the script uploading interface sends this URL to the extension point manager in the SAAS platform, to register the URL in association with the extension point ID and the application ID. This is the URL that can be invoked directly from inside a SAAS service instance at a later point. In some embodiments, the extension point manager also returns a handle (e.g. script ID of the script), so that it can be modified or removed as necessary later. A success indicator may be sent back to the script creator at 510.

It is not always necessarily the case that the execution of the script happens on a separate machine, or via a URL for the specific execution. It can be called/invoked directly within the SAAS service provider by downloading the compiled script locally and then invoking.

In some embodiments, compiled script (in script storage 320) may be stored on a machine or processor that executes service instance code or generally on any machine/processor within the SAAS platform. Depending on where the script is stored, alternatives to invoking the script via URL are possible e.g. the extension point manager could also invoke the script locally within the service instance to get the compiled script to execute for example via e.g. a pointer, ID, etc. Generally, the script could also be run or executed in-process within the service instance, externally via URL, or in a separate container on the SAAS platform.

In some embodiments, the script manager may be configured to send the script to a front end device for execution by the front end device in certain circumstances, for example when the device goes offline. If this is done in advance of a front end device going offline, it is possible for the script to continue to be executed by the front end device even after going offline.

At 520, a client requests a specific already registered application to be installed against their service instance. The application installation interface 314 receives this request, records the installation in the application installations register, and returns an application installation success indication at 522.

Figure 5:
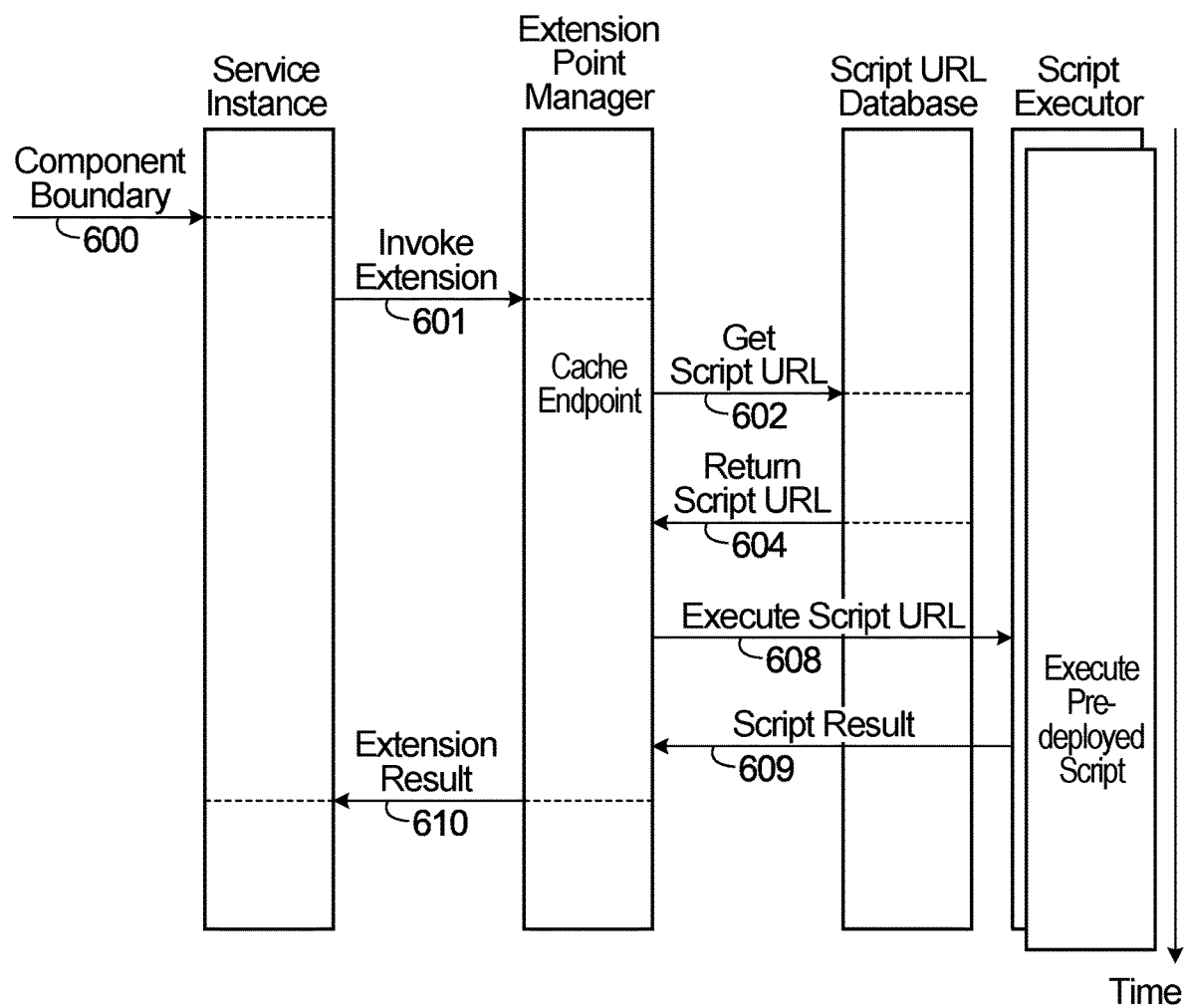
FIG. 5 shows an example of script execution.

It is noted that the steps involving the client, including 520, 522 can be performed any time after an application has been registered. Scripts may be created and uploaded in association with an application after that application has been registered and installed for one or more service instances FIG. 5 shows an example of script execution, which can take place after the steps of FIG. 4 are complete, again using the components of FIG. 1. To begin, at 600, code to execute some function, for which there is an extension point, is called inside the service instance. The called function is wrapped via an extensions software development kit (SDK), and so the default implementation of that function is not executed yet. The service instance informs the extension manager at 601. At 602, the extension manager attempts to obtain a script URL from the script URL database. Note that for a script URL to be used for the service instance, the associated application must have been installed on the service instance. This determination can be made by the extension manager. If there is a script URL for the extension point, the script URL DB returns the script's invocation URL at 604. In some embodiments, the extension manager may cache this result. Then, instead of calling the default implementation of the function, the URL is accessed at 608 to execute the customization block. Where no URL is available, a default implementation of the function may be executed. The result is synchronously returned back to the extension point manager at 609 and then to the service instance 610. The service instance remains unaware as to what code was run.

In some embodiments, the whole process is tightly controlled with timeouts, failure handlers and circuit breakers, ensuring all the networking meets specified targets to remain useful in low latency operations.

Figure 6:
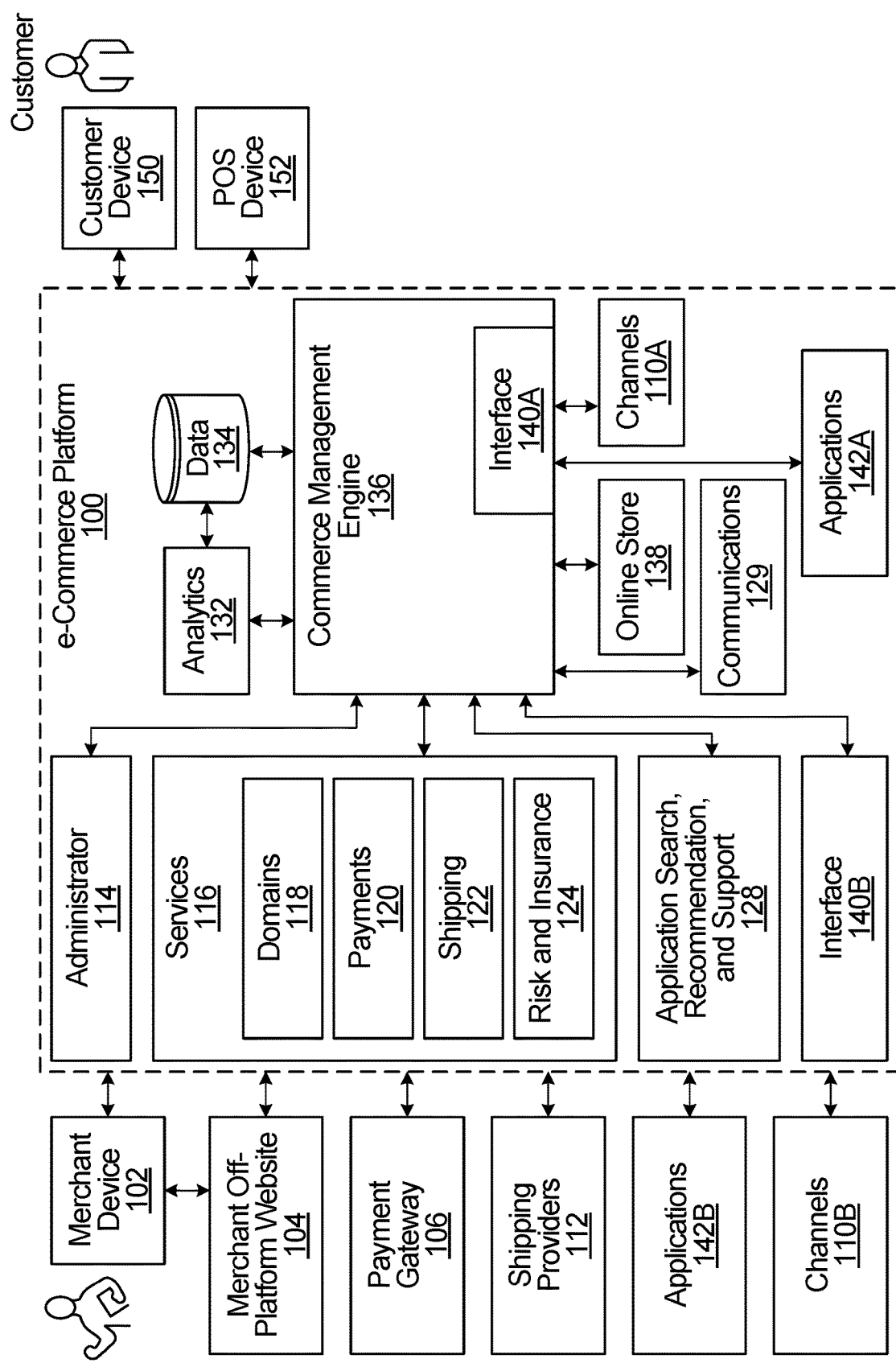
FIG. 6 is a block diagram of an e-commerce platform, according to one embodiment.

With reference to FIG. 6, an embodiment e-commerce platform 100 is depicted for providing merchant products and services to customers. This is a specific example of a SAAS platform for implementing one or more of the embodiments described herein. For example, the functionality of SAAS platform of FIG. 1 may be implemented in e-commerce platform 100 of FIG. 6. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through point of sale (POS) devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 7 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 7. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 6, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may make a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

The e-commerce platform 100 may be providing sales channels for multiple merchants, for their respective customers, and for varying types of merchandise. Payment gateways 106 are provided by the e-commerce platform or by external parties to process transactions in an e-commerce environment.

Numerous modifications and variations of the present disclosure are possible in light of the above teachings. It is therefore to be understood that within the scope of the appended claims, the disclosure may be practiced otherwise than as specifically described herein.

The invention claimed is:

1. A software as a service (SAAS) platform comprising:
a memory storing computer executable code to implement a plurality of service instances for execution on the SAAS platform, the computer executable code comprising a plurality of extension points, each of the extension points having a respective specified format including defined inputs and outputs;
at least one processor for executing said computer executable code;
for a software application registered on the SAAS platform and installed on at least one of the service instances, a script associated with at least one of the plurality of extension points, the script stored on the SAAS platform for execution on the SAAS platform;
wherein during execution of said computer executable code for the at least one service instance, when the at least one of the plurality of extension points is reached:
executing on the SAAS platform the script associated with the at least one of the plurality of extension points, including exchanging inputs and outputs between the computer executable code and the script in accordance with the specified format(s) of the at least one of the plurality of extension points that is reached;
wherein the SAAS platform is an e-commerce platform, and each service instance is an online store.

2. The SAAS platform of claim 1 further comprising:
an interface for registering the at least one software application on the SAAS platform.

3. The SAAS platform of claim 1 further comprising:
an interface for uploading the script in association with the at least one extension point and in association with the software application registered on the SAAS platform.

4. The SAAS platform of claim 1 further comprising:
a script manager configured to send the script to a front end device for execution by the front end device.

5. The SAAS platform of claim 1 further comprising:
a script executor configured to execute the script.

6. The SAAS platform of claim 1 further configured to determine whether the script is available for a particular extension point and for a particular service instance.

7. The SAAS platform of claim 6 wherein the SAAS platform determines the script is available when:
the script is associated with the particular service instance; and
the software application is installed on the particular service instance.

8. The SAAS platform of claim 1 further comprising:
a script execution selector that selects between executing the script on the SAAS platform and calling an API to execute code associated with the software application on an external hosting infrastructure.

9. The SAAS platform of claim 8 wherein the script execution selector selects based on one or more of:
capacity of the SAAS platform to execute the script;
load balancing;
fee structure;
current performance of the external hosting infrastructure in executing the code;
criticality of the software application set on a per-service instance basis;
preferences set on a per-service instance basis.

10. The SAAS platform of claim 1 further comprising:
for each of at least one extension point associated with the script, respective default logic stored in the memory that is executed for a given service instance when the software application is not installed for the service instance when during execution of computer executable code for the given service instance, one of the at least one of the plurality of extension points associated with the script is reached.

11. The SAAS platform of claim 1 further comprising:
one or more data structures stored in memory containing:
a list of available extension points;
for each of a plurality of software applications, and for each of the available extension points, an indication of whether a script has been uploaded;
for each service instance, an indication of which software applications are installed.

12. A method executed on a SAAS platform, the method comprising:
executing computer executable code to provide a service instance in respect of which a third party application has been installed, the computer executable code including an extension point, the extension point having a respective specified format including defined inputs and outputs;
wherein during execution of said computer executable code for the service instance, the extension point is reached, executing on the SAAS platform a script associated with the extension point and the third party application, including exchanging inputs and outputs between the computer executable code and the script in accordance with the specified format(s) of the at least one of the plurality of extension points that is reached;
wherein the SAAS platform is an e-commerce platform, and the service instance is an online store.

13. The method of claim 12 further comprising:
receiving input registering the third party application on the SAAS platform.

14. The method of claim 12 wherein the computer executable code includes a plurality of extension points, the method further comprising determining whether a script is available for a particular extension point and for the service instance.

15. The method of claim 14 determining whether a script is available for a particular extension point and for the service instance comprises determining the script is available when:

the script is associated with the particular service instance; and the software application is installed on the particular service instance.

16. The method of claim 12 further comprising:

at least some of the time, selecting between executing the script on the SAAS platform and calling an API to execute code associated with the application on an external hosting infrastructure.

17. The method of claim 16 wherein said selecting is based on one or more of:

capacity of the SAAS platform to execute the script;

load balancing;

fee structure;

current performance of the external hosting infrastructure in executing the code;

criticality of the software application set on a per-service instance basis;

set preferences.

* * * * *